US008131788B1

(12) United States Patent  (10) Patent No.: US 8,131,788 B1
    Chirila-Rus  (45) Date of Patent: Mar. 6, 2012

(54) DETERMINING SUM OF ABSOLUTE DIFFERENCES IN PARALLEL

(75) Inventor: Toader-Adrian Chirila-Rus, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 1247 days.

(21) Appl. No.: 11/890,655

(22) Filed: Aug. 6, 2007

(51) Int. Cl.
    *G06F 15/00* (2006.01)
(52) U.S. Cl. ....................................................... 708/201
(58) Field of Classification Search .................... 708/201
    See application file for complete search history.

(56) References Cited

U.S. PATENT DOCUMENTS

| 5,610,850 | A  | * | 3/1997  | Uratani et al. | 708/671 |
| 6,317,819 | B1 | * | 11/2001 | Morton | 712/22 |
| 6,473,529 | B1 | * | 10/2002 | Lin | 382/236 |
| 7,054,895 | B2 |   | 5/2006  | Koba et al. | |
| 7,376,686 | B2 | * | 5/2008  | Johnson et al. | 708/201 |
| 2003/0118103 | A1 | * | 6/2003 | Guevorkian et al. | 375/240.12 |

* cited by examiner

*Primary Examiner* — Chuong D Ngo
(74) *Attorney, Agent, or Firm* — W. Eric Webostad; Gerald Chan

(57) ABSTRACT

Determining a sum of absolute differences using a circuit is described. Pairs of inputs, including a respective current value and a respective previous value, are obtained. The previous value is subtracted from the current value for each of the pairs of inputs to provide differences and associated carries. Inverted carries are applied to the differences to pass a first portion of the differences associated with positive absolute differences and to invert and then pass a second portion of the differences associated with negative absolute differences. The inverted carries are summed. The first portion and the second portion are provided to an adder tree to generate an interim sum of absolute differences. The sum of inverted carries obtained over a number of clock cycles is added to the interim sum of absolute differences obtained over the number of clock cycles to generate a sum of absolute difference result.

18 Claims, 6 Drawing Sheets

DETERMINING SUM OF ABSOLUTE DIFFERENCES IN PARALLEL

FIELD OF THE INVENTION

The invention relates to integrated circuit devices (ICs). More particularly, the invention relates to determining sum of absolute differences in parallel in an IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

In Motion Estimation ("ME") for processing image frames, it is well-known to use an ME algorithm. Many of such ME algorithms depend upon a Sum of Absolute Differences ("SAD") calculation for providing a cost metric for making ME decisions. With respect to a current image frame ("C") being processed as related to a previous or reference image frame ("P"), a sum of absolute differences calculation may be performed on each associated pair of pixels in the frames. Thus, for an image frame having a width "Width," namely Width columns of pixels, and a height "Height", namely Height rows of pixels, a sum of absolute differences calculation for processing C and P image frames may be mathematically expressed as:

$$SAD = \sum_{x=1}^{Width} \sum_{y=1}^{Height} |C_{x,y} - P_{x,y}|$$

More generally, an absolute value ("ABS") of A minus B, namely |A−B|, may have a positive difference or a negative difference, even though the magnitude of either of such differences is always positive. Mathematically, a positive difference may be expressed as A−B, and a negative difference may be expressed as B−A, or stated another way:

$$|A - B| = \begin{cases} A - B & A \geq B \\ B - A & A < B \end{cases} = \begin{cases} (A + \overline{B}) & A \geq B \\ \overline{(A + \overline{B})} + 1 & A < B \end{cases}$$

For an image frame of a reasonable viewing size, there are many pixels to process. Furthermore, each pixel may be expressed using multiple bits. Thus, there is a significant amount of processing to be done for a sum of absolute differences calculation on image frames. Furthermore, the processing time is conventionally increased by waiting for forward propagation of each carry bit.

Accordingly, it would be desirable and useful to provide a sum of absolute differences calculation in circuitry with faster processing.

SUMMARY OF THE INVENTION

One or more aspects generally relate to determining sum of absolute differences in parallel in an IC.

An aspect relates generally to a circuit configured to perform a sum of absolute differences operation. The circuit has difference units. The difference units are coupled to receive pairs of inputs and are configured to provide carry information and result information. A first summation block is coupled to receive the carry information from each of the difference units. The first summation block is configured to output a sum responsive to number of negative differences indicated by the carry information obtained from the subtraction logic of each of the difference units. A second summation block is coupled to receive the result information and is configured to add the result information to provide a partial sum of absolute differences. A first accumulator is coupled to receive the sum. The first accumulator is configured to accumulate the sum output from the first summation block for n clock cycles, for n a positive integer greater than one, to provide a first accumulation. A second accumulator is coupled to receive the partial sum of absolute differences. The second accumulator is configured to accumulate the partial sum of absolute differences for the n clock cycles to provide a second accumulation. The second accumulator is coupled to the first accumulator to provide the first accumulation to the second accumulator for an n+1 clock cycle. The second accumulator configured to add the first accumulation to the second accumulation. The second accumulation is configured to output the second accumulation as a sum of absolute differences result.

Another aspect relates generally to another circuit configured to perform a sum of absolute differences operation. The circuit has N stages of difference units for N a positive integer greater than one. The difference units are coupled to receive pairs of inputs. The pairs of inputs are different for different stages of the N stages and are different among the difference units for performing a portion of the sum of absolute differences operation on a grouping of data. The difference units are configured to provide carry information and result information responsive the pairs of inputs. A summation block is coupled to receive the carry information from each of the difference units and is configured to output a total value responsive to the carry information received from each of the difference units. The total value indicates a sum of the negative difference for all of the difference units for a period of time. The result information from each of the difference units of a first stage of the N stages and the result information from each of the difference units of a second stage of the N stages are respectively input to first stage adders. Output of the first stage adders is respectively input to either second stage adders or an adder tree. The adder tree is coupled to receive output from N−1 stage adders and the total value from the summation block of each of the N stages of the difference units. The adder tree is configured to add the output from the N−1 stage adders and the total value for all of the difference units for each of the N stages of difference units to provide a sum of absolute differences result.

Yet another aspect of the invention relates generally to a method for determining sum of absolute differences. Pairs of inputs are obtained. Each of the pairs of inputs includes a respective current value and a respective previous value. The previous value is subtracted from the current value for each of the pairs of inputs to provide differences and associated carries. The carries are inverted to provide inverted carries. The inverted carries are applied to the differences to pass a first portion of the differences associated with positive absolute differences and to invert a second portion of the differences associated with negative absolute differences. The inverted carries associated with the negative absolute differences are summed to provide a sum. The first portion and the second portion are provided to an adder tree to generate an interim sum of absolute differences. The steps are repeated over a number of clock cycles. On a last clock cycle the sum obtained over the number of clock cycles is added to the interim sum of absolute differences obtained over the number of clock cycles to generate a sum of absolute difference result.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
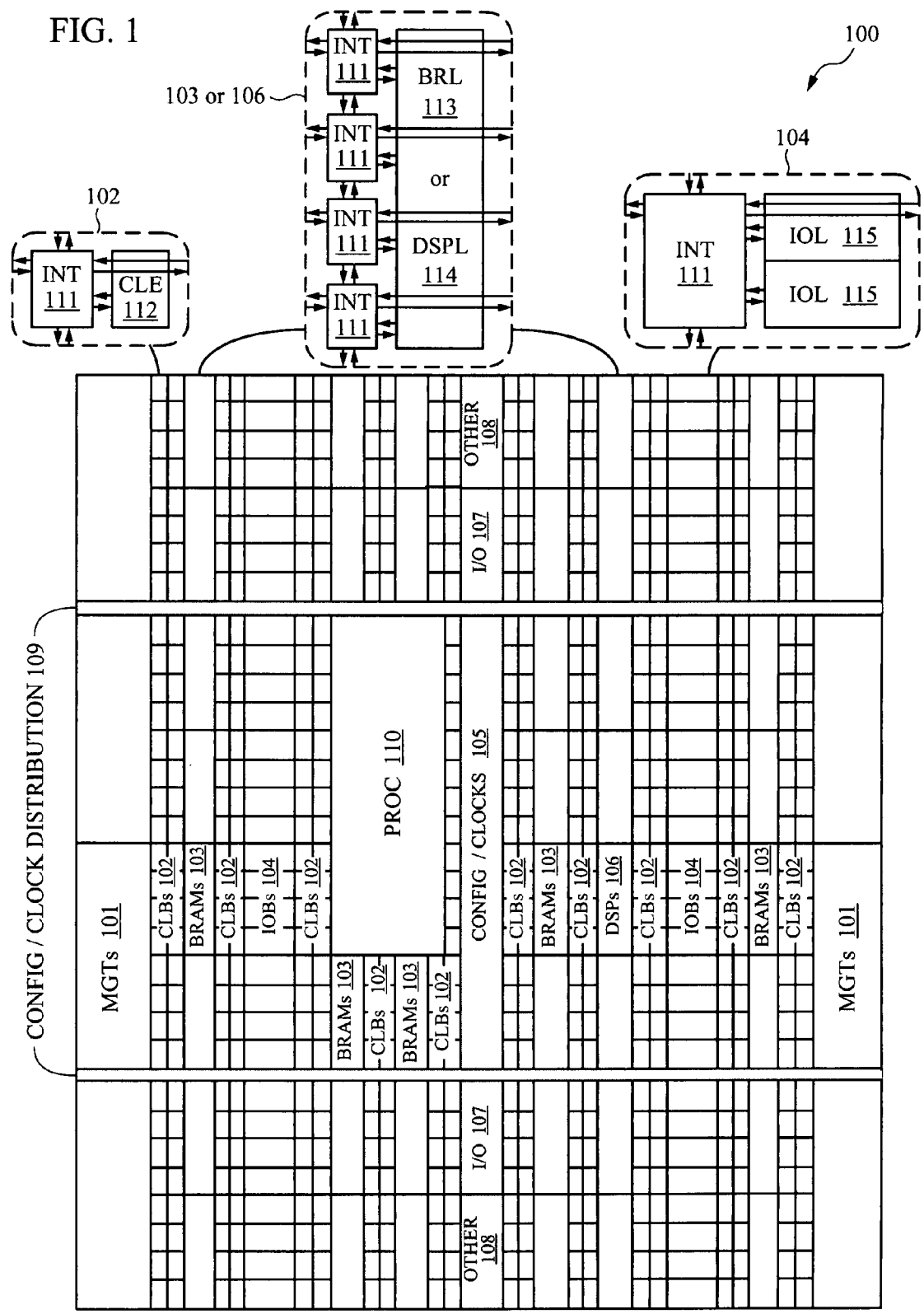
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IPB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 2 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
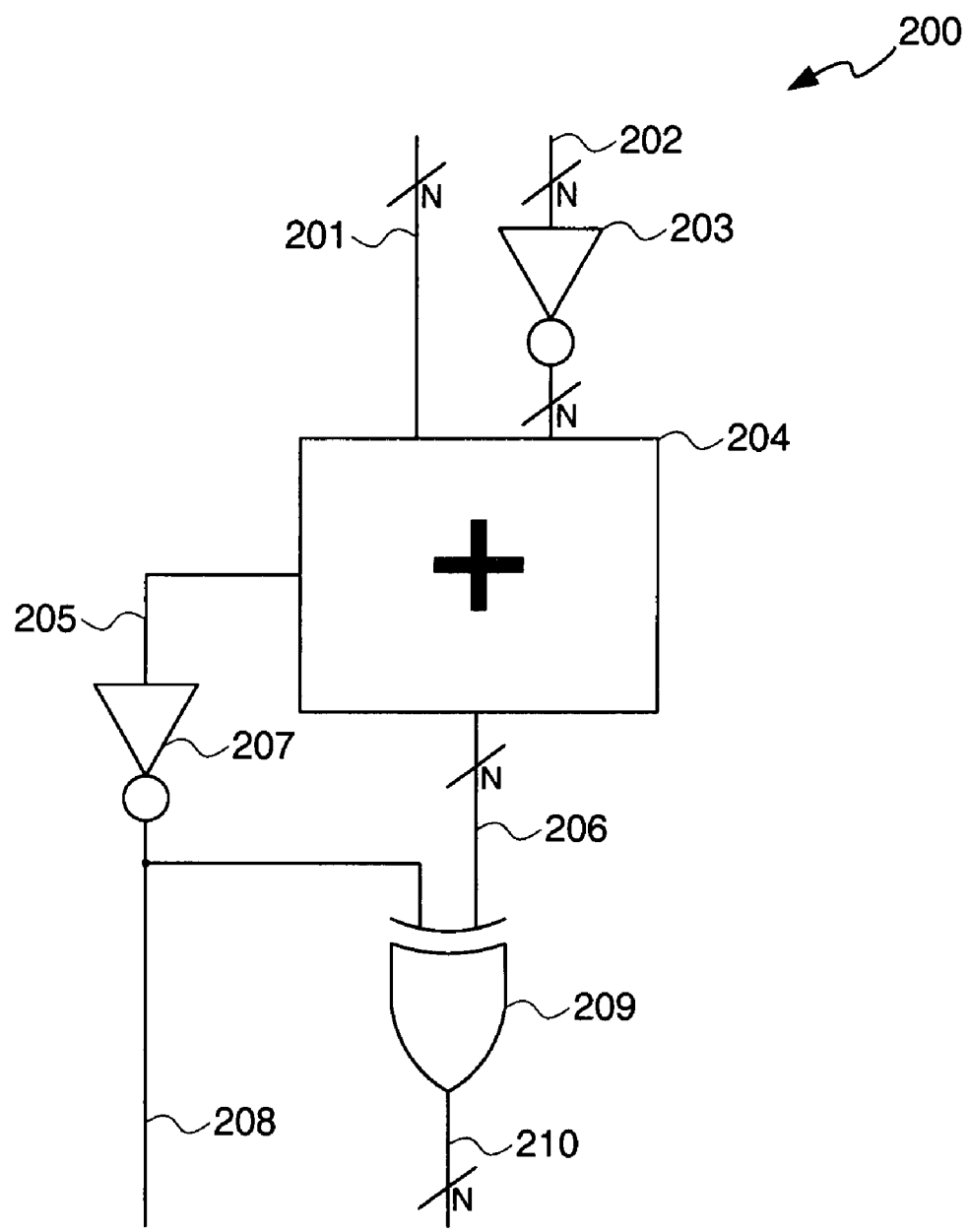
FIG. 2 is a block/circuit diagram depicting an exemplary embodiment of a sum of absolute difference unit.

FIG. 2 is a block/circuit diagram depicting an exemplary embodiment of a sum of absolute differences unit ("difference unit") 200. Difference unit 200 includes inverters 203 and 207, adder 204, and exclusive-OR ("XOR") gate 209. Notably, it should be appreciated that other logic circuitry may be used in accordance with functions described herein for difference unit 200.

A pair of inputs 201 and 202 is received by difference unit 200. For purposes of clarity by way of example and not limitation, it shall be assumed that inputs 201 and 202 are for ME. Thus, input 201 may be pixel information associated with a current frame being processed, and input 202 may be pixel information associated with a previous frame being processed. Pixel information respectively associated with inputs 201 and 202 is for a same pixel location within a frame.

For this example, it shall be assumed that N is 8, and thus 8-bit wide inputs 201 and 202 are used; however, it should be appreciated that other bit widths may be used. Accordingly, it should be appreciated that circuitry described herein is representative of circuitry that would be used for processing 8 bits, but is not shown for purposes of clarity by way of example and not limitation. Thus, for example, 8 inverters 203 are not shown for inverting each of the 8 bits provided via input 202.

Input 202 is provided to inverter 203, and inverter 203 inverts input 202. Output of inverter 203 is provided as an input to adder 204, and another input to adder 204 is input 201. Thus, effectively because input 202 is inverted it is subtracted from input 201 by adder 204. Output from adder 204 is for this example an 8-bit wide difference 206 and a 1-bit carry 205.

Carry 205 is input to inverter 207. Output of inverter 207 is provided as a 1-bit "reminder" 208 and as an input to XOR gate 209. Another input to XOR gate 209 is difference 206. Output 210 of XOR gate 209 is either an inverted version of difference 206 or difference 206 without inversion. XOR gate 209 either inverts or passes difference 206 responsive to output of inverter 207.

It should be appreciated that the output of inverter 207 is exclusive-OR'd with each bit of difference 206. For a negative difference output from adder 204, carry 205 will be a logic 0. Accordingly, output of inverter 207 will be a logic 1. A logic 1 input to XOR gate 209 inverts difference 206 for providing inverted difference 210. If, however, output of adder 204 is a positive difference, carry 205 is a logic 1. Accordingly, output of inverter 207 will be a logic 0. A logic 0 input to XOR gate 209 means that difference 206 is passed through as difference 210 without inversion.

Thus, it should be appreciated that the combination of inverter 207 and XOR gate 209 means that XOR gate 209 is effectively operated as a controlled inverter. In other words, every time a carry 205 output of adder 204 indicates a negative difference, XOR gate 209 inverts difference 206, and each time a carry 205 output of adder 204 indicates a positive difference, XOR gate 209 passes difference 206.

For carry 205 being a logic 0, thus indicating a negative difference, output of inverter 207 is a logic 1. This means that "reminder" bit 208 is a logic 1. However, in contrast to a conventional approach where another addition is immediately done to add a logic 1 to the result to obtain an absolute value, addition of "reminder" bit 208 is delayed, as described below in additional detail. This delaying of the addition of the logic 1 reminder bit 208 for a negative difference is used to accelerate processing to obtain a sum of absolute differences result.

Figure 3:
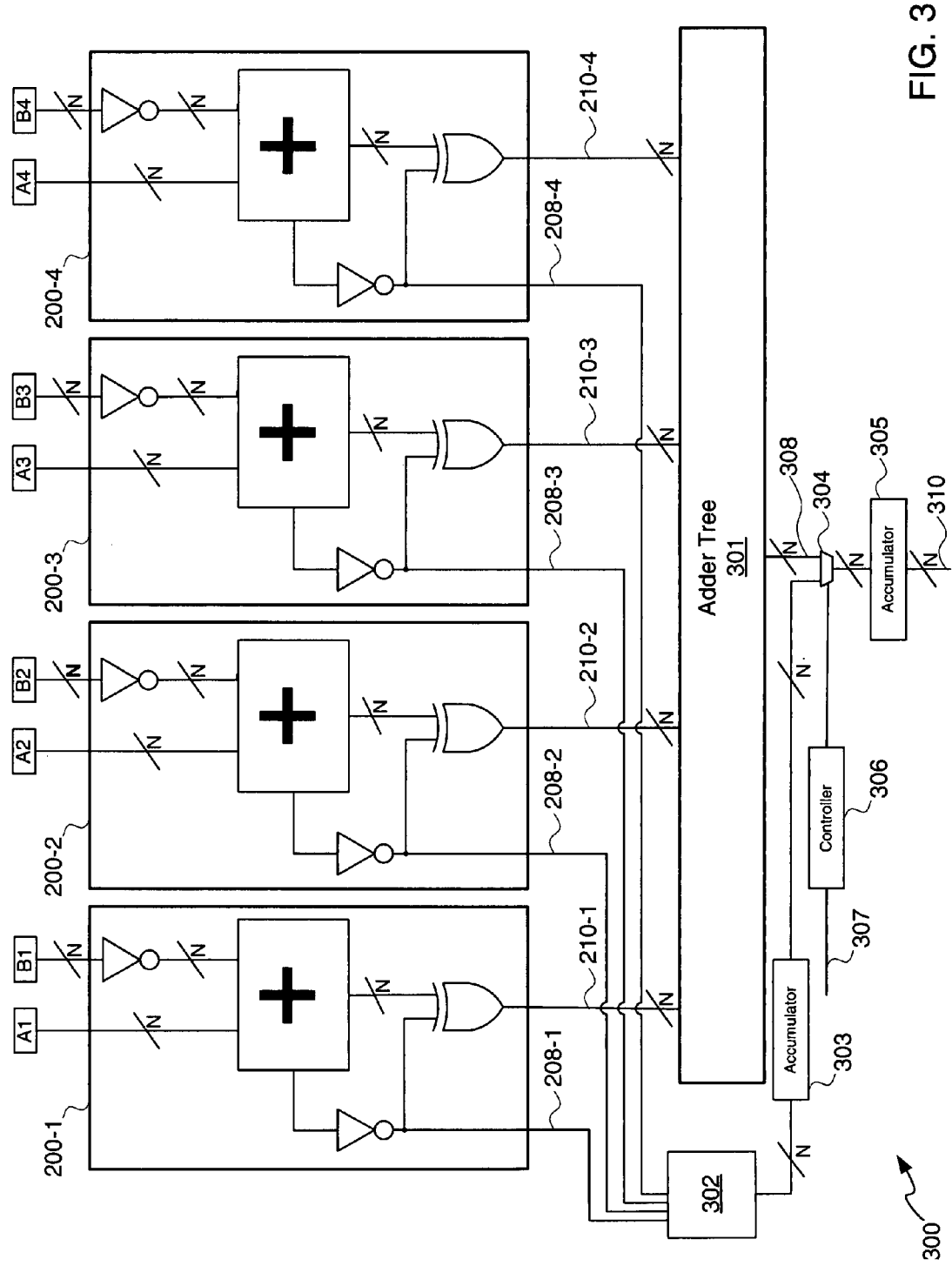
FIG. 3 is a block/circuit diagram depicting an exemplary embodiment of a semi-parallel sum of absolute differences circuit.

FIG. 3 is a block/circuit diagram depicting an exemplary embodiment of a semi-parallel sum of absolute differences circuit ("differences circuit") 300. It should be appreciated that differences circuit 300 is clocked responsive to a clock signal, such as clock signal 307, for inputting data thereto. For purposes of clarity by way of example and not limitation, the ME example described above with reference to FIG. 2 shall be continued. Data inputs A1 through A4 represents pixel information from four separate pixels of a current frame, and data B1 through B4 represents pixel information from four location-associated separate pixels of a previous frame. Furthermore, for purposes of clarity and not limitation, it shall be assumed that a four pixel by four pixel block of information is being processed. Thus, for example, during a first clock cycle, data inputs A1 through A4 may be a first row of pixels of such a block for a current image block being processed, and inputs B1 through B4 may be a first row of pixels of such a block for a previous block associated with the current image block. A second row from both current and previous blocks may be processed on a second clock cycle, and so on, until all four rows are processed using four separate clock cycles to obtain a sum of absolute differences result. On an added clock cycle, which in this example is a fifth cycle, an accumulated reminder value 208 may be added to the partial accumulated sum of absolute differences result to provide a complete result, as described below in additional detail.

For a first cycle of clock signal 307, data inputs A1 through A4 and data inputs B1 through B4 are provided as previously described with reference to inputs 201 and 202, respectively, of FIG. 2. In this example, differences circuit 300 includes four difference units 200-1 through 200-4 ("difference units 200"). Such difference units were previously described with reference to difference unit 200 of FIG. 2, and so their description is not repeated here for purposes of clarity.

It should be appreciated that although the example of four difference units 200 is illustratively shown, fewer or more difference units 200 may be used. Reminder outputs 208-1 through 208-4 respectively of difference units 200-1 through 200-4 are respectively input to summation block 302.

Summation block 302 may be implemented as a look-up table or a one bit adder tree for example. For purposes of clarity by way of example and not limitation, it shall be assumed that summation block 302 is implemented as a look-up table using a memory, such as random access memory.

On a first clock cycle, all, some, or none of reminders 208-1 through 208-4 may be logic 1s indicating that all, some, or none of the differences as determined by sum of absolute difference units 200-1 through 200-4 are negative. Furthermore, all, some, or none of reminders 208-1 through 208-4 may be logic 0s indicating that all, some, or none of the differences determined by sum of absolute difference units 200-1 through 200-4 have positive differences.

By respectively inputting reminders 208-1 through 208-4 to look-up table ("LUT") 302, such input reminders may form an address. The address may correspond to a value indicating the sum of logic 1s in the address. Accordingly, output of LUT 302 is the number of logic 1s for a given clock cycle. Output of LUT 302 is provided to accumulator 303 for accumulation of each total for each clock cycle, other than an added clock cycle in which difference units 200 are not used. Output from LUT 302 and accumulator 303 are each indicated as being N bits wide; however, a value other than N may be used. Moreover, though N is also the number of difference units in this example, the number of difference units need not equal the bit width output from LUT 302 and accumulator 303. Likewise, outputs from adder tree 301, multiplexer circuit 304, and accumulator 305 are all indicated as being N bits wide; however, a value other than N may be used, and not all of these outputs have to have the same bit width.

On a clock cycle, differences 210-1 through 210-4 respectively output from sum of absolute difference units 200-1 through 200-4 are respectively input to adder tree 301 for being added one to another to provide an interim sum of absolute differences output 308.

Output of accumulator 303 is provided to an input of multiplexer circuit 304, and output of adder tree 301 is provided to another input of multiplexer circuit 304. A control signal for multiplexer circuit 304 is provided from controller 306. Controller 306 may include a counter that is clocked responsive to clock signal 307.

For clock cycles for processing each row of a block of pixel information in this example, output of controller 306 selects output of adder tree 301 for passing through multiplexer circuit 304. For an added final clock cycle of clock signal 307, responsive to output of controller 306, output of accumulator 303 is selected for passing through multiplexer circuit 304. Output of multiplexer circuit 304 is provided to accumulator 305.

For purposes of clarity by way of example and not limitation, the above example will be described with particular numerical values; however, it should be appreciated that numerical values other than those described herein may be used. For a four-pixel-by-four pixel block, with four difference units 200-1 through 200-4 receiving respective pixel inputs associated with a row of such a block, it will take four clock cycles to process all pixels. On a first clock cycle, a first row of pixel data from each of a current and a previous block is obtained. Suppose for example that there are three logic 1s out of a possible 4 logic 1s in all of reminders 208-1 through 208-4 for these first rows. Accordingly, a value of three will be obtained from LUT 302 and passed into accumulator 303. On a next clock cycle of signal 307, a second set of rows of data from such blocks are input respectively to sum of difference units 200-1 through 200-4. Assume for example that on this second clock signal there are two logic 1s in all of the reminders 208-1 through 208-4. Accordingly, LUT 302 will access a value of two and provide it to accumulator 303. Thus, at this point in the example, accumulator 303 will have stored therein a value of five.

Continuing the example, suppose on a third clock cycle of clock signal 307, a third row of pixel information is respectively input to sum of difference units 201-1 through 201-4 for both current and previous blocks. Suppose for this set of rows being processed, there are no logic 1s in all of reminders 208-1 through 208-4. Accordingly, LUT 302 will either output a zero value or not output any value for accumulator 303. Thus, the value in accumulator 303 after the third clock cycle will be the same as it was after the second clock cycle in this example (i.e., 5, in the example).

Continuing the example, suppose for a fourth clock cycle of clock signal 307, fourth rows of pixel information from a current and a previous block are respectively input to sum of difference units 200-1 through 200-4. Suppose for this set of rows from a current and previous block, there is one logic 1 in all of reminders 208-1 through 208-4. Accordingly, LUT 302 will output a value of one for accumulator 303. Thus the accumulated value after four clock cycles in this example will be six.

During each of the four clock cycles, differences 210-1 through 210-4 are respectively output from difference units 200-1 through 200-4. On each clock cycle, adder tree 301 adds differences 210-1 through 210-4 for that clock cycle and provides an interim sum of absolute difference output 308 for accumulator 305 via multiplexer 304. This interim sum of absolute difference for each clock cycle is accumulated in accumulator 305, as multiplexer 304 is controlled by controller 306 to pass output of adder tree 301 to accumulator 305 during the first four clock cycles in this example. Thus, after the fourth clock cycle, accumulator 305 has a sum of absolute differences except for the reminder value stored in accumulator 303. Thus, the sum in accumulator 305 at this time may be thought of as a partial or incomplete sum of absolute differences.

On an added final clock cycle, namely a fifth clock cycle in this example, controller 306 selects output of accumulator 303 for providing to accumulator 305. Thus the accumulated value in accumulator 303, which in this example is six, is passed to accumulator 305. Accumulator 305 adds in the output of accumulator 303 to the partial sum of absolute differences to obtain a complete result for the block being processed, namely a complete sum of absolute differences 310 for all of the pixels between a current block and a previous block.

It should be appreciated that the number of difference units 200 may be scaled to accommodate the number of pixels in a row of a block, frame, or other grouping of data being processed. Furthermore, it is not necessary to process a row at a time; rather, columns at a time may be processed. Alternatively, any number of data points from a block may randomly be selected at a time for comparison with four associated data points from another block. Additionally, it should be appreciated that depending on the number of iterations of data to be processed, namely the number of rows of pixels, which in the above example is four, only one additional clock cycle need be added in order to obtain a sum of absolute differences. Thus, for n, an integer greater than one, iterations to be performed, a sum of absolute differences result may be obtained in n+1 clock cycles with differences circuit 300.

Figure 4:
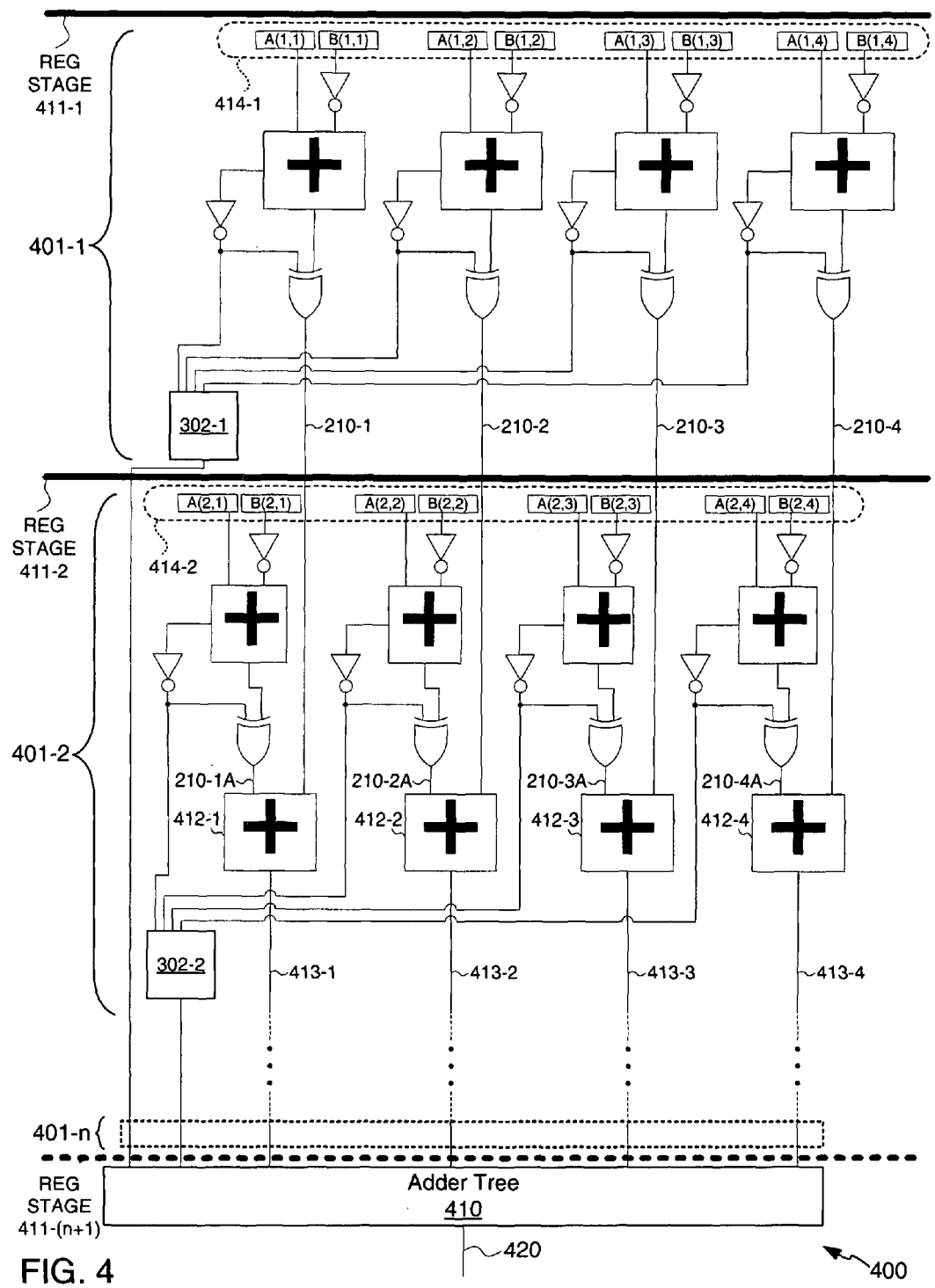
FIG. 4 is a block/circuit diagram depicting an exemplary embodiment of a parallel sum of absolute differences circuit.

FIG. 4 is a block/circuit diagram depicting an exemplary embodiment of a parallel sum of absolute differences circuit ("differences circuit") 400. Differences circuit 400 includes two stages of difference units ("stages") 401-1 and 401-2, (collectively, "stages 401"). Each of these stages 401 may include four difference units 200 as described with reference to FIG. 3 and receives a different input, for example sets of inputs 414-1 (A(1,1) through A(1,4) and B(1,1) through B(1, 4)) and 414-2 (A(2,1) through A(2,4) and B(2,1) through B(2,4)) respectively provided to stages 401-1 and 401-2. Additionally, each stage 401-1 and 401-2 includes a respective LUT, namely LUTs 302-1 and 302-2.

Though only two stages 401 are illustratively shown, it should be appreciated that more than two stages may be implemented. Furthermore, fewer or more than four difference units 200 may be used. Continuing the above example of a four-by-four-pixel block, four stages 401 may be implemented where each stage includes four difference units 200. Associated with stage 401-2 are four adders 412-1 through 412-4. Outputs 210-1 through 210-4 of stage 401-1 are respectively provided as inputs to adders 412-1 through 412-4. Additionally, outputs 210-1A through 210-4A of respective XOR gates of stage 401-2 are respectively provided as other inputs to adders 412-1 through 412-4.

Adders 412-1 through 412-4 provide respective outputs 413-1 through 413-4 responsive to addition of the differences of stages 401-1 and 401-2.

Outputs 413-1 through 413-4 for differences circuit 400 having more than two stages would be provided to another set of adders, similar to adders 412-1 through 412-4, but associated with a third stage (not shown). If differences circuit 400 had only two stages, then outputs 413-1 through 413-4 would be provided as inputs to adder tree 410.

Accordingly, it should be appreciated that adders for adding together differences may be cascaded from stage to stage in order to accumulate a total of all differences for all stages at a final stage. Thus, it should be appreciated that such adders may form an adder tree within stages 401-1 through 401-$n$. Thus, rather than n iterations, there are n stages. Stage 401-$n$ is illustratively shown in FIG. 4 as a dashed box and is not drawn in detail for purposes of clarity.

Output from summation blocks 302-1 and 302-2 are respectively provided as inputs to adder tree 410. Notably, in contrast to sum of absolute difference circuit 300 of FIG. 3, accumulators are not used. It should be understood that differences 210-1 through 210-4 for a clock cycle are associated with output from LUT 302-1. Likewise, differences 210-1A through 210-4A of stage 401-2 are associated with an output of LUT 302-2 for a clock cycle. In order to maintain synchronization of output from a look-up table with corresponding differences for a stage, such as stage 401-1 or 401-2, registers may be used.

Inputs from sets of inputs 414-1 and 414-2 may be respectively registered by register stages 411-1 and 411-2 prior to being fed into their respective stages 401-1 and 401-2. Likewise, output of such stages 401-1 and 401-2 may be registered prior to being output to next adders associated with next stages or an adder tree. For example, output of stage 401-1 may be registered in register stage 411-2, prior to being output to the adders associated with stage 401-2. Output of each subsequent stage may likewise be registered by respective register stages, until an optional final register stage 411-($n$+1) registers output of a final stage 401-$n$ and output from that final register stage is propagated to adder tree 410 to be combined with output from respective LUTs of each stage. Thus, returning to the example of only two stages, outputs of LUTs 302-1 and 302-2 are added by adder tree 410 along with accumulated differences output from adders 412-1 through 412-14, namely accumulated differences 413-1 through 413-4.

However, if four stages with four difference units in each stage were used to correspond to a four-by-four-pixel block of information, it should be appreciated that once latency associated with filing a pipelined implementation of sum of absolute differences circuit 400 had lapsed, a sum of absolute differences result 420 may be output on each subsequent clock cycle. Thus, for the example of two stages, on a first clock cycle register stage 411-1 clocks in inputs 414-1 to stage 401-1. On a second clock cycle, register stage 411-1 clocks in another set of data 414-1, and register stage 411-2 clocks in a set of data 414-2 and clocks in differences 210-1 through 210-4 for synchronous input into adders 412-1 through 412-4 of stage 401-2, and output from LUT 302-1. If delays are added, final register stage 411-($n$+1), where n+1 is equal to three in this example, may be avoided such that data flows from stage 401-2 into adder tree 410 without another registration. Alternatively, an output register stage 411-($n$+1) may be used to capture the output of LUTs 302-1 and 302-2 as well as accumulated differences 413-1 through 413-4, after the completion of the second clock cycle. In this alternative embodiment, on a third clock cycle such output captured on the second clock cycle as previously described would be provided to adder tree 410 for providing a sum of absolute differences result 420. Thus, there may be a two or three clock cycle latency for the two stage example. More generally, for n stages, there may be an n or n+1 clock cycle latency before such a pipeline is capable of outputting a sum of absolute differences on each clock cycle.

For implementation in an FPGA, it should be appreciated that DSP blocks of such an FPGA may be used. For a Virtex™-4 DSP48 block available from Xilinx, Inc. of San Jose, Calif., for example, multiple difference units may be implemented within a same DSP48 block. Notably, the number of difference units that may be implemented is dependent at least in part upon the bit width of the inputs to such difference units. For example, 8-bit wide inputs for differences circuit 300 of FIG. 3 may be implemented in a single DSP48 block with respect to difference units 200-1 through 200-4. However, at least two difference units with 8-bit wide inputs may be implemented in a single DSP48 block for a variety of applications. Furthermore, these at least two difference units may have less than or greater than 8-bit wide inputs as implemented in a DSP48 block. Adder tree 301 may be implemented using programmable logic or dedicated logic. Furthermore, accumulators 303 and 305 and multiplexer 304 may be implemented using programmable logic or dedicated logic. LUT 303 may be implemented using LUTRAM or BRAM. Alternatively, for a 1-bit adder tree rather than a LUT, programmable logic or dedicated logic may be used.

Additionally, it should be understood that an adder was used rather than a subtractor as described above for differences unit 200 of FIG. 2, even though a subtractor rather than an adder may be used. However, an adder is less complicated than a subtractor, and thus is generally more easily implemented. Additionally, use of addition rather than subtraction, or more particularly use of adders rather than subtractors, facilitates concatenation of multiple DPS48s as described below in additional detail.

Figure 5:
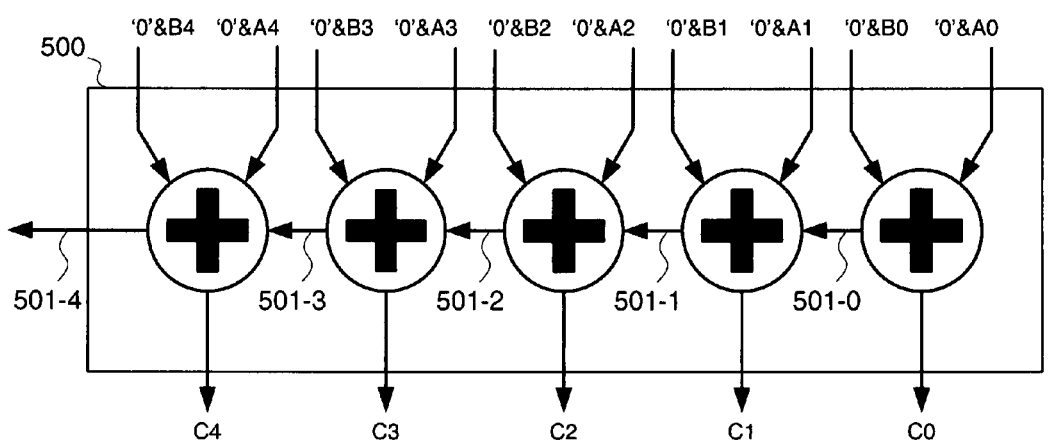
FIG. 5 is a block diagram depicting an exemplary embodiment of a DSP48 block having sets of data inputs.

FIG. 5 is a block diagram depicting an exemplary embodiment of a DSP48 block 500 having sets of data inputs as previously described with reference to FIG. 3 for providing respective carry outputs. DSP block 500 may be a DSP block 106 of FIG. 1. Additionally, an extra logic 0 is inserted at boundaries of addition operands as indicated by arrows 501-0 through 501-4. The insertion of an extra logic 0 at the boundaries is to ensure that carries C0 through C4 do not propagate between additions. In other words, the extra logic 0 is inserted at the boundaries to make a clear separation between additions. Thus, it should be appreciated that the absolute value in the accumulation of several difference units may be implemented such that they share a common DSP block 500.

Figure 6:
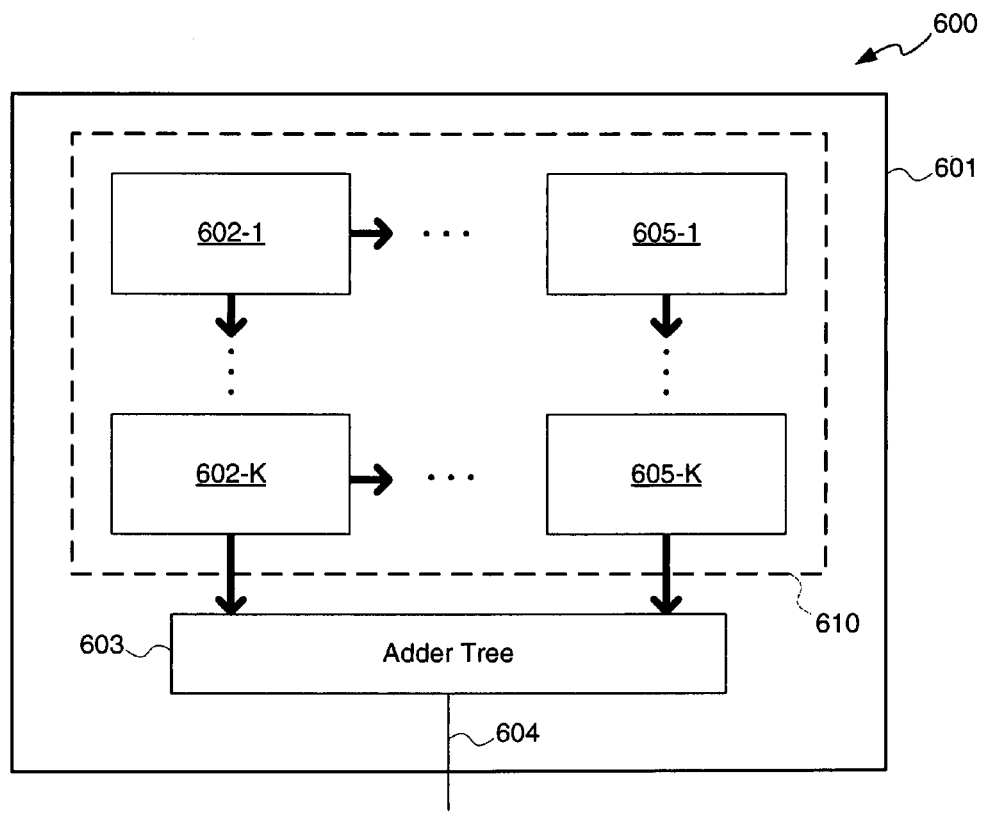
FIG. 6 is a block diagram depicting an exemplary embodiment of a frame processing system.

FIG. 6 is a block diagram depicting an exemplary embodiment of a frame processing system 600. Frame processing system 600 may be implemented in an FPGA 601. FPGA 601 may be FPGA 100 of FIG. 1. DSP blocks 602-1 through 602-n may be coupled in series as previously described with reference to FIG. 4, where each such DSP block represents a stage as previously described with reference to stages 401-1 and 401-2. The output of a final DSP block 602-n may be coupled to an adder tree 603 which is implemented in programmable logic of FPGA 601 in order to produce a sum of absolute differences 604. It should be appreciated that the number of DSPs 602-1 through 602-n may be scaled according to the number of stages desired to be implemented. Likewise, if more sum of absolute difference units, such as difference units 200 of FIG. 3, are to be included in a stage than may be implemented in a single DSP block 602-1, additional DSP blocks 605-1 through 605-n may be concatenated to counterpart DSP block 602-1 through 602-n as generally indicated by array of DSP blocks 610. Furthermore, because adder tree 603 may be implemented in programmable logic, adder tree 603 may be scaled to the number of DSP blocks in a row or column of an array of DSP blocks 610 implemented in FPGA 601.

Figure 7:
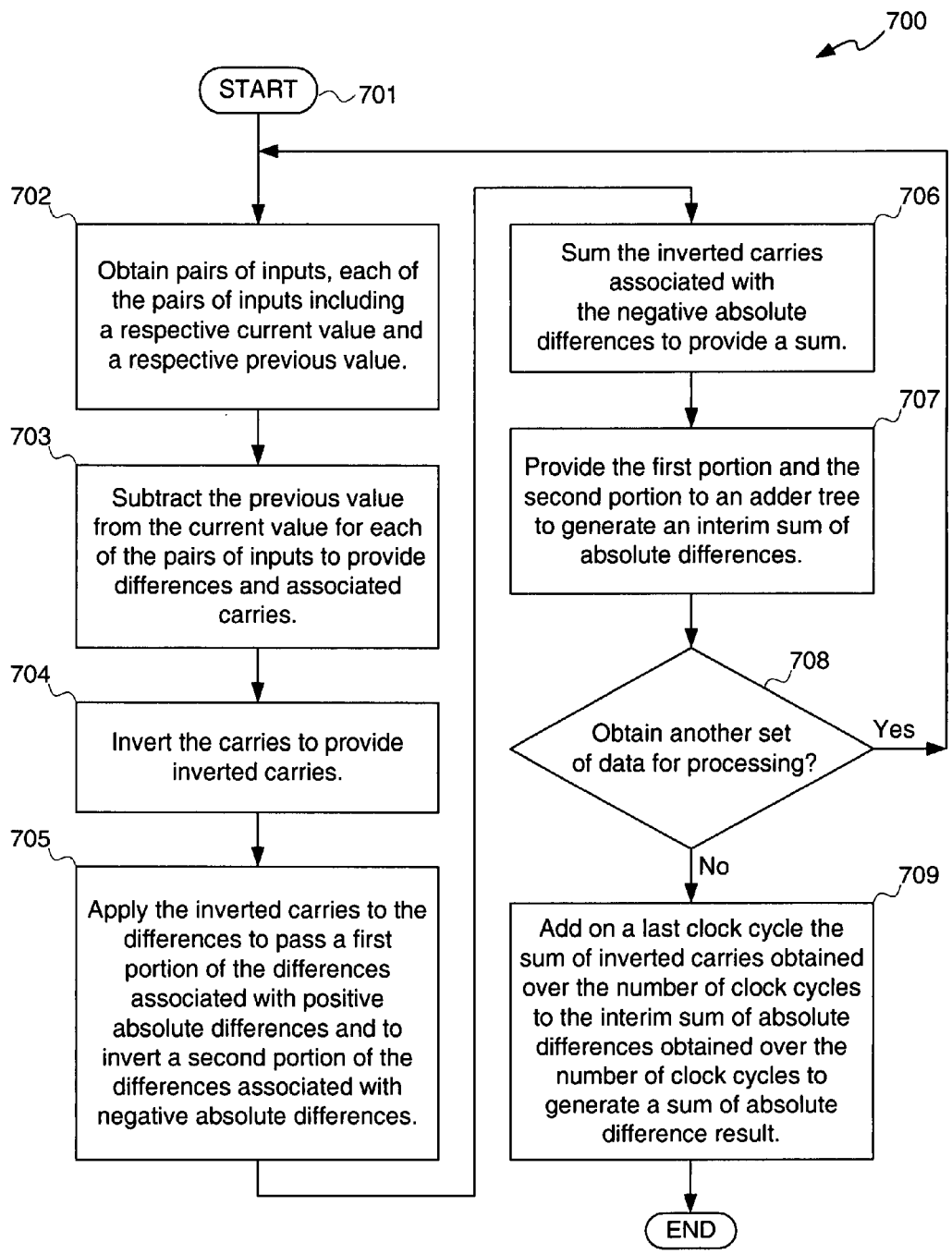
FIG. 7 is a flow diagram depicting an exemplary embodiment of a sum of absolute differences flow in accordance with the circuits described herein.

FIG. 7 is a flow diagram depicting an exemplary embodiment of a sum of absolute differences flow 700 in accordance with the circuits described herein. Flow 700 may be initiated at 701. At 702, pairs of inputs for one or more stages of difference units may be obtained. Each of the pairs of inputs may include a respective current value and a respective previous value associated therewith.

At 703, the previous value is subtracted from the current value for each of the pairs of inputs obtained at 702 to provide differences associated therewith as well as carry values indicating whether or not negative or positive differences were obtained by such subtraction.

At 704, the carries may be inverted to provide inverted carries. At 705, the inverted carries may be applied to the differences obtained at 703 for either passing without inversion those differences which have positive outcomes, or inverting and then passing those differences that have negative outcomes for providing to either a next stage or an adder tree. A portion of the differences may have positive outcomes and another portion of the differences may have negative outcomes for a set of differences. Likewise, all of the differences may have only positive outcomes, or only negative differences for a set of difference outcomes.

At 706, the inverted carries associated with the negative differences may be summed to provide a total for each set of differences. The set of differences may be provided to an adder tree for purposes of generating an interim sum of absolute differences at 707.

At 708, it is determined whether another set of data for 702 is to be obtained for processing for a stage. This may be associated with another clock cycle as previously described. If another set of data is to be obtained then steps 702 through 707 are repeated. If, however, another set of data is not to be obtained, then at 709 the sum of inverted carries obtained over the number of iterations of steps 702 through 707 is added to the interim sum of absolute differences obtained over the same number of iterations to generate a sum of absolute differences result for all the data processed for a grouping of data.

As previously described, obtaining totals for inverted carries over a number of iterations and obtaining totals for interim sums of absolute differences over a number of iterations may be done by respective accumulations or may be done by pipelining with registration. Furthermore, it should be appreciated that a programmable logic device may be configured using DSP blocks to implement the sum of the absolute differences circuits described herein.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A circuit configured to perform a sum of absolute differences operation, comprising:
   difference units;
   the difference units coupled to receive pairs of inputs and configured to respectively provide carry information and a result information;
   a first summation block coupled to receive the carry information from each of the difference units;
   the first summation block configured to output a sum responsive to number of negative differences indicated by the carry information obtained from each of the difference units;
   a second summation block coupled to receive the result information;
   the second summation block configured to add the result information to provide a partial sum of absolute differences;
   a first accumulator coupled to receive the sum;
   the first accumulator configured to accumulate the sum output from the first summation block for n clock cycles, for n a positive integer greater than one, to provide a first accumulation;
   a second accumulator coupled to receive the partial sum of absolute differences;
   the second accumulator configured to accumulate the partial sum of absolute differences for the n clock cycles to provide a second accumulation;
   the second accumulator coupled to the first accumulator, which is configured to provide the first accumulation to the second accumulator for an n+1 clock cycle;
   the second accumulator configured to add the first accumulation to the second accumulation to obtain a sum of absolute differences result.

2. The circuit according to claim 1, wherein:
   each of the difference units includes subtraction logic and output logic;
   the subtraction logic is coupled to receive a respective current value and a respective previous value forming a pair of the pairs of inputs;
   the subtraction logic is configured to subtract the previous value from the current value to provide a carry output and a result output respectively for the carry information and the result information;
   the output logic is coupled to receive the carry output and the result output;
   the output logic is configured to invert the carry output to provide an inverted carry output;
   the output logic is configured to apply the inverted carry output to the result output;
   the output logic is configured to invert the result output to provide an inverted result output responsive to the inverted carry output indicating a negative difference of the result output and to pass the inverted result output to an adder tree;

the output logic is configured to pass the result output without inversion to the adder tree responsive to the carry output indicating a positive difference of the result output;

the inverted carry outputs are provided from the subtraction logic of each of the difference units;

the second summation block is an adder tree;

the adder tree is coupled to receive either the result output or the inverted result output from the output logic of each of the difference units for addition thereof to provide each instance of the partial sum of absolute differences;

the adder tree and the first accumulator are coupled to the second accumulator via a multiplexing circuit;

the multiplexing circuit is configured to pass the partial sum of absolute differences from the adder tree to the second accumulator for each of the n clock cycles and to pass the first accumulation to the second accumulator on the n+1 clock cycle;

the subtraction logic includes an adder and a first inverter; and the first inverter being coupled to receive the previous value and configured to invert the previous value for subtraction from the current value.

3. The circuit according to claim 2, wherein:

the output logic includes a second inverter and an exclusive-OR circuit;

the second inverter coupled to receive the carry output and configured to provide the inverted carry output; and the exclusive-OR circuit coupled to receive the inverted carry output and the result output and configured for application of the inverted carry output to the result output to invert the result output to provide the inverted result output responsive to the inverted carry output indicating the negative difference of the result output and to pass the result output responsive to the carry output indicating the positive difference of the result output.

4. The circuit according to claim 3, wherein the first summation block is either a look-up table or another adder tree.

5. The circuit according to claim 2, wherein the difference units are implemented in a single digital signal processing block of a programmable logic device.

6. The circuit according to claim 2, wherein the difference units are implemented using at least one digital signal processing block capable of having at least two of the difference units; and wherein each of the at least two of the difference units is capable of at least an eight-bit-wide value for each of the current value and the previous value pair for each of the pairs of inputs.

7. The circuit according to claim 6, further comprising an extra logic 0 inserted at a boundary of each addition operand to preclude the carry output of the subtraction logic of each of the difference units from propagating between additions thereof.

8. A method for determining sum of absolute differences, comprising:

obtaining pairs of inputs;

each of the pairs of inputs including a respective current value and a respective previous value;

subtracting the previous value from the current value for each of the pairs of inputs to provide differences and associated carries;

inverting the carries to provide inverted carries;

applying the inverted carries to the differences to pass a first portion of the differences associated with positive absolute differences and to invert a second portion of the differences associated with negative absolute differences;

summing the inverted carries associated with the negative absolute differences to provide a sum;

providing the first portion and the second portion to an adder tree to generate an interim sum of absolute differences;

wherein the above steps are performed a number of times over a number of clock cycles; and wherein the method further comprises:

accumulating the sum over the number of clock cycles to obtain a first accumulation;

accumulating the interim sum of absolute differences over the number of clock cycles to obtain a second accumulation; and in a clock cycle after the number of clock cycles, adding, using a processor, the the first accumulation and the second accumulation to generate a sum of absolute difference result.

9. A circuit configured to perform a sum of absolute differences operation, comprising:

difference units configured to receive pairs of inputs, and to respectively provide a carry information and a result information;

a first accumulator configured to obtain a sum that indicates a number of negative differences based on the carry information from each of the difference units, and accumulate the sum for n clock cycles to provide a first accumulation, n being an integer greater than 1; and a second accumulator configured to obtain a partial sum of absolute differences based on the result information from each of the difference units, and to accumulate the partial sum of absolute differences for the n clock cycles to provide a second accumulation;

wherein the second accumulator is configured to receive the first accumulation in an n+1 clock cycle, and add the first accumulation to the second accumulation to obtain a sum of absolute differences result.

10. The circuit of claim 9, wherein the difference units belong to a first stage, and the circuit further comprises:

a second stage of difference units, wherein each of the difference units in the second stage is configured to provide a result information, the difference units in the first stage and the difference units in the second stage configured for performing a portion of the sum of absolute differences operation on a grouping of data;

first stage adders configured to receive the result information from each of the difference units of the first stage; and second stage adders configured to receive the result information from each of the difference units of the second stage;

wherein output of the first stage adders is respectively input to either the second stage adders or an adder tree.

11. The circuit according to claim 9, wherein:

each of the difference units includes subtraction logic;

the subtraction logic of the each of the difference units is coupled to receive a respective current value and a respective previous value forming one of the pairs of inputs;

the current value is obtained from a current version of the grouping of data;

the previous value is obtained from a prior version of the grouping of data; and the subtraction logic is configured to subtract the previous value from the current value to provide a carry output and a result output respectively for the carry information and the result information.

12. The circuit according to claim 11, wherein:
each of the difference units also includes output logic;
the output logic includes an inverter and an exclusive-OR circuit;
the inverter is configured to receive the carry output and provide an inverted carry output; and
the exclusive-OR circuit is configured to receive the inverted carry output and the result output, and apply the inverted carry output to the result output to either (1) invert the result output to provide an inverted result output when the result output has a negative difference, or (2) pass the result output when the result output has a positive difference.

13. The circuit according to claim 11, wherein the first stage of the difference units and the second stage of the difference units are pipelined.

14. The circuit according to claim 13, wherein the first stage of the difference units and the second stage of the difference units include a cascade of digital signal processing blocks of a programmable logic device.

15. The circuit according to claim 13, wherein the first stage of the difference units and the second stage of the difference units include at least a two-by-two array of digital signal processing blocks of a programmable logic device.

16. The circuit according to claim 15, wherein:
each of the digital signal processing blocks is capable of having at least two of the difference units in the first stage or the second stage;
each of the at least two of the difference units in the first stage or the second stage is capable of at least an eight-bit-wide value for each of the current value and the previous value of each of the pairs of inputs.

17. The circuit according to claim 15, further comprising an extra logic 0 being inserted at a boundary of each addition operand to preclude the carry output of the subtraction logic of each of the difference units in the first stage and the second stage from propagating between additions thereof.

18. The circuit according to claim 9, further comprising a summation block configured to receive the carry information from each of the difference units and configured to output a total value responsive to the carry information received from each of the difference units.

* * * * *